United States Patent [19]
Evans et al.

[11] 3,884,563
[45] May 20, 1975

[54] MICROTOME WITH ROTATING KNIFE

[75] Inventors: James King Evans, Reading, Pa.;
Roy Mills, Rossville, Ind.

[73] Assignee: John C. Fox, Auburn, N.Y. ; a part interest

[22] Filed: May 30, 1973

[21] Appl. No.: 365,048

Related U.S. Application Data
[62] Division of Ser. No. 132,120, April 7, 1971, abandoned.

[52] U.S. Cl. .................. 352/131; 352/84; 352/121
[51] Int. Cl. .......................................... G03b 29/00
[58] Field of Search ...................... 352/131, 84, 121

[56] References Cited
UNITED STATES PATENTS
3,649,108   3/1972   Ahrens et al. ........................ 352/84

*Primary Examiner*—Monroe H. Hayes
*Attorney, Agent, or Firm*—John C. Fox

[57] ABSTRACT

A microtome apparatus is described in which thin serial sections of organic material are cut from a stained and frozen specimen advancing into a rotating knife, so as to permit motion picture gross, micro- or macro-photography of a cross-section of the specimen. A refrigerated and insulated housing maintains the specimen in frozen condition during sectioning and filming.

The apparatus enables the production of better quality films in shorter times than were possible with previous cinemicrotome designs. The films are useful as diagnostic, research and educational tools in the areas of medicine, life science and ecology.

9 Claims, 5 Drawing Figures

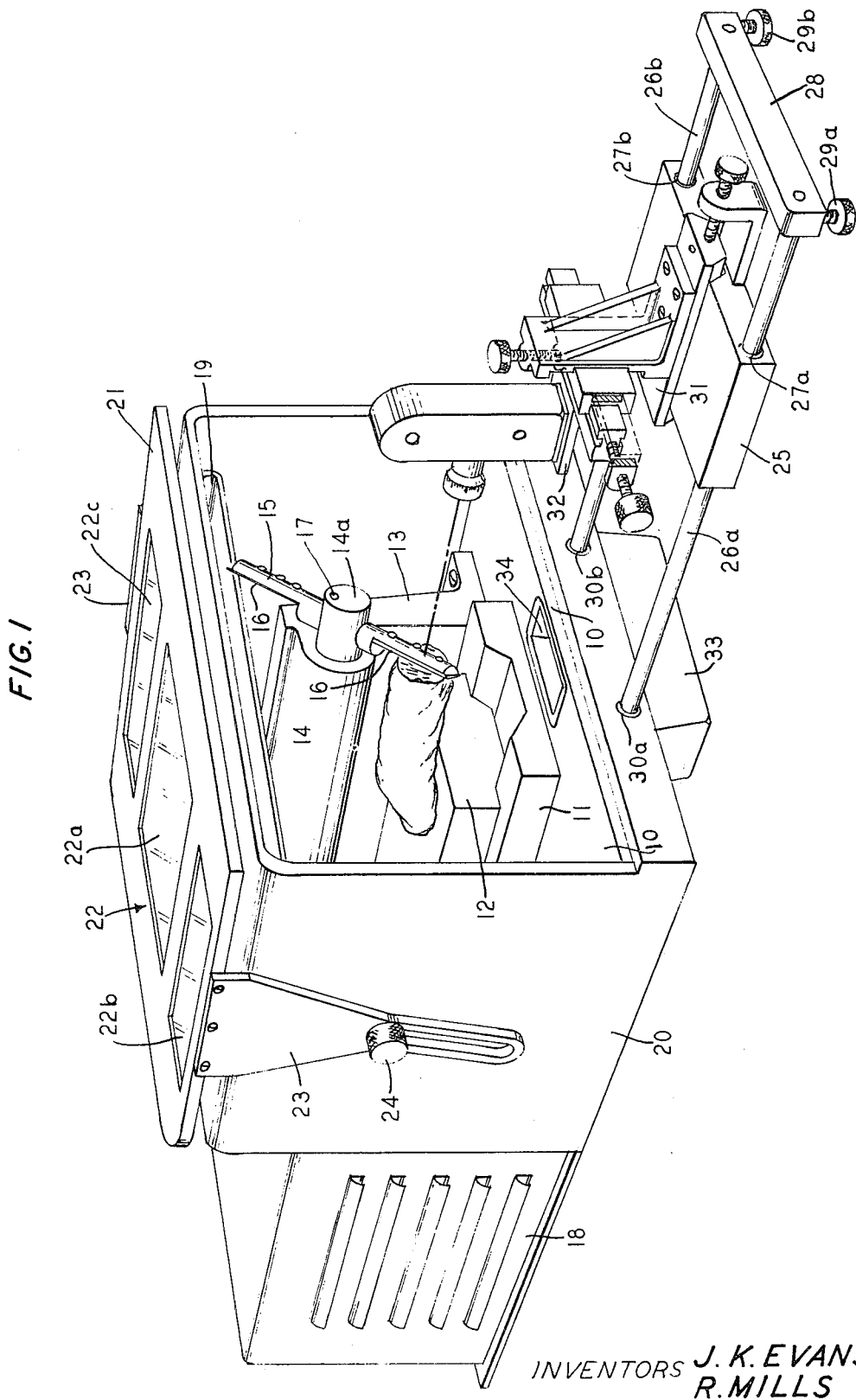

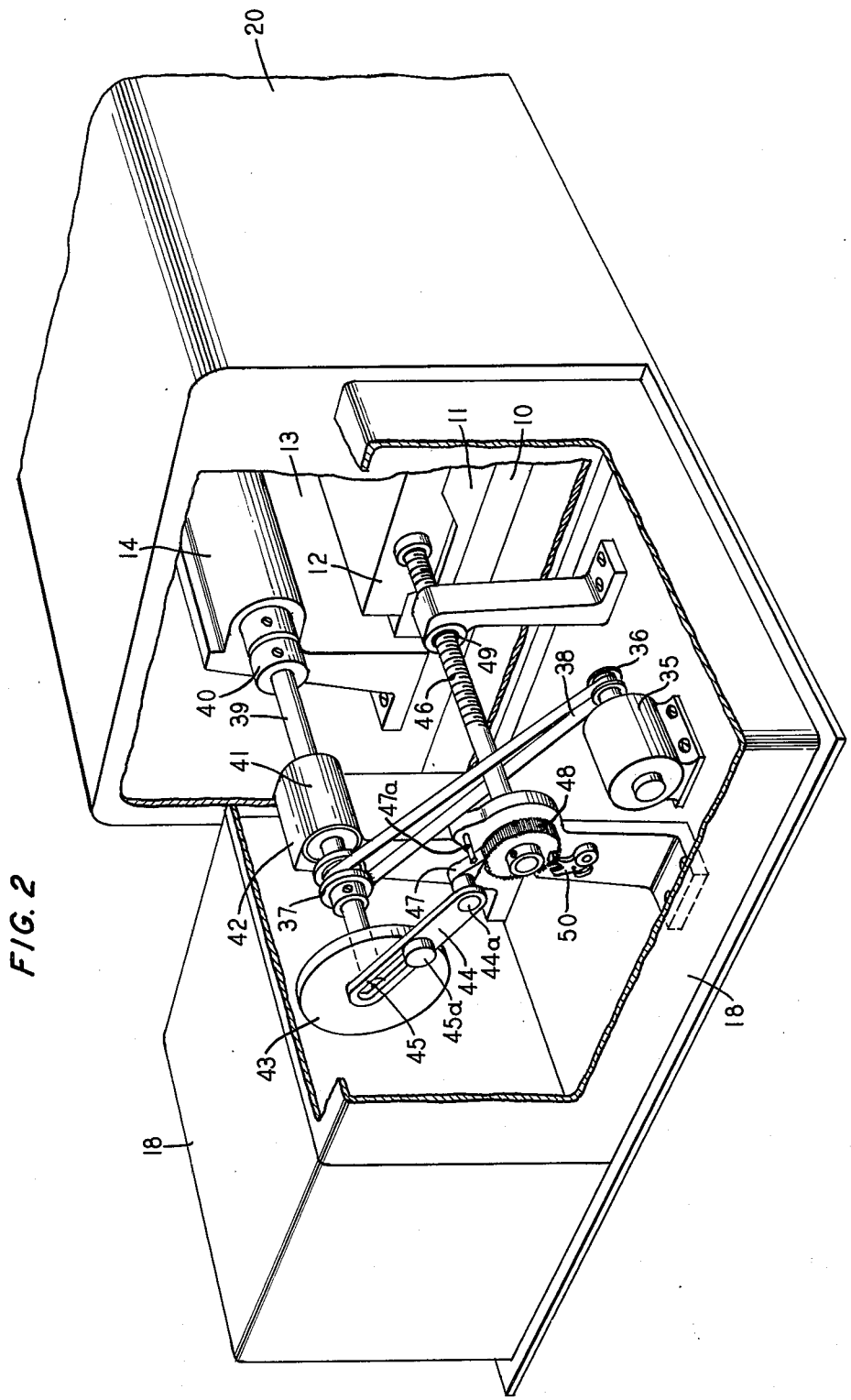

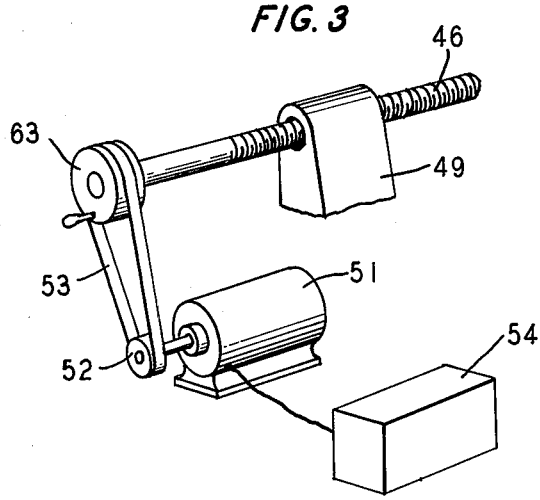
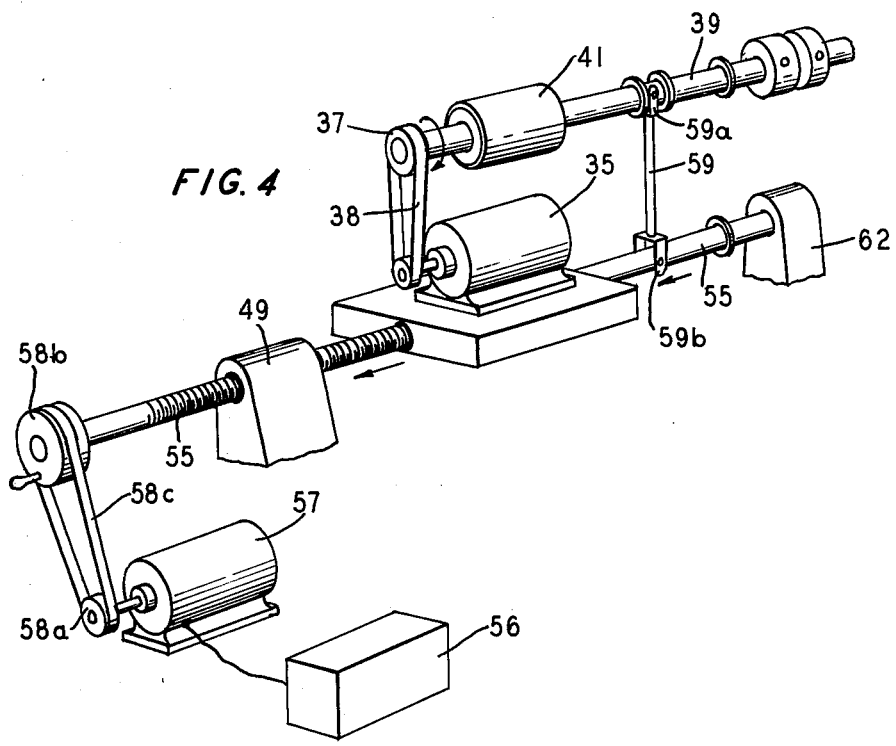
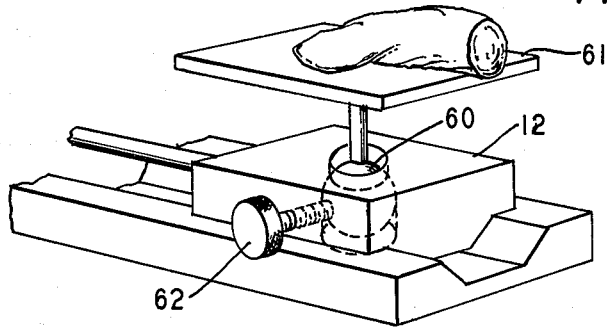

MICROTOME WITH ROTATING KNIFE

This is a division of application Ser. No. 132,120, filed Apr. 7, 1971, now abandoned.

BACKGROUND OF THE INVENTION

1. Field of the Invention

This invention relates to a microtome apparatus, and more particularly to such an apparatus employing a rotating knife.

2. Prior Art

The desireability of photographing serial sections of a specimen in motion picture format has been recognized for many years. Efforts to accomplish this can be traced back to the early part of this century. These efforts were rewarded with marginal success largely because of the difficulties involved with aligning the individual stained sections (or slides) in precision registration with the camera.

Recently, it was discovered that photographing the face from which the section has been cut, instead of photographing the section itself, simplifies the registration problem. Based upon this discovery, an apparatus has been constructed to facilitate the operation of obtaining films of the serial sections. This apparatus is the subject of U.S. Pat. copending application Ser. No. 876,329, filed Nov. 13, 1969.

Unfortunately, the above apparatus is large and cumbersome, and has not performed properly due to some basic engineering faults. The functional features of the appartus necessitate specimen preperation and sectioning which results in gross distortion of the tissues. Specifically, the specimen is embedded in a block of petroleum-based medium, at about 140°F, and then indexed to various stations in sequence, at each of which a seperate operation is performed, such as cutting, prestaining, rinsing and staining. Such an arrangement necessitates use of a reciprocating knife to cut the serial sections, which has been found to result in rippling and serration of the specimen, leading to degradation of the photographic image.

Rinsing and staining may be repeated using various stains before the specimen has moved into its photo position. Carryover of the stains from one staining operation to the next results in contamination, leading to uneven coloring of the specimen, thus further degrading the photographic image.

Moreover, the time involved for each cycle may be as much as five minutes, so that the total time required to photograph a specimen as large as the human brain is typically 40 days, based on 12 hour days.

Finally, the continuous indexing of the large table tends to cause vibrations, thus leading to registration problems and malfunctions of the camera.

SUMMARY OF THE INVENTION

A microtome apparatus has been developed which utilizes a rotating knife to cut serial sections from a specimen, resulting in smooth-cut surfaces of the specimen. The apparatus provides for serial sectioning by advancement of either the specimen or rotating knife along an axis approximately parallel to, and in some cases axial to the line of sight of the observer, camera lens or other recording or analyzing instrument.

The microtome apparatus in its various embodiments has wide application as a diagnostic, research and educational tool in the medical sciences, life sciences and ecology.

A primary application of the apparatus is in the automatic exposure of a small predetermined number of frames of motion-picture film following each sectioning of the specimen, resulting in a film which when projected gives the impression that the observer is actually moving through the specimen, thus permitting the tracing of selected elements or features (such as vascularity, neural bundles, anatomical structures, foreign deposits such as lead or mercury, etc.) through an organ or other specimen, while maintaining visual reference to other anatomical features.

The camera may be replaced by other recording or analyzing instruments, such as a television camera (to provide real-time viewing) or video tape recorder, optical or computer scanner (permitting, for example, computer analysis of nuclear and cortical geometries).

The apparatus ordinarily includes means for advancing the specimen or knife so as to achieve cut sections from one to 200 microns in thickness, either by incremental advancement or by continuous advancement which is syncronized with the rate of rotation of the knife. The knife may rotate continuously or incrementally.

Syncronization of the rotation of the knife with a camera or other recording or analyzing instrument may be achieved with conventional timer means. Where, for example, a motion-picture film or video tape is to be produced, the camera or recorder may be syncronized to record from one to several frames of each newly-cut surface of the specimen.

The apparatus ordinarily includes a refrigeratable enclosure to preserve a bulk-stained and frozen specimen in its frozed state in the microtome for extended periods of time.

A support base riding on precision guides and equipped with precision adjusting means, such as a three-axis micropositioner, may be provided for the recording or analyzing instrument, to permit scanning, gross and fine adjustments, etc. The refrigeratable housing may, for example, provide support for the precision rods.

BRIEF DESCRIPTION OF THE DRAWING

FIG. 1 is a front perspective view of a preferred embodiment of the invention;

FIG. 2 is a rear perspective view, partly cut away, of the preferred embodiment of FIG. 1, showing detail of the specimen advancing means and knife rotating means;

FIG. 3 is a schematic illustration of means for advancing the specimen which are alternative to the means shown in FIG. 2;

FIG. 4 is a schematic illustration of means for simultaneously advancing and rotating the knife; and FIG. 5 is a perspective view of a universally adjustable specimen support plate.

DETAILED DESCRIPTION OF THE INVENTION

Referring now to FIG. 1, there is shown a front perspective view of a preferred embodiment of the invention. Base 10 supports a channeled guide 11, in which slides specimen support base 12. The vertically positioned plate 13 is secured to base 10 a short distance to one side of guide 11 and supports precision spindel 14. Spindel head 14a contains a cylindrically shaped hole bored along an axis normal to the axis of rotation of spindel 14, in order to accomodate bar knife 15.

Parts of the bar on one side have been machined flat to accommodate blades 16, which may be of the wedge or chisel type, and are preferably stainless steel or other durable metal. Set screw 17 secures the position of bar knife 15 and may be loosened to permit angular adjustment of the blades relative to the specimen. The specimen, which will ordinarily be frozen, may be attached to its support base 12 by spreading a thin film of water thereon, placing the specimen in the desired position on the film and holding it there for the short time required for the film to freeze, thus forming the desired bond. The temperature needed to maintain the specimen in a frozen condition (from about −30°C to +30°C) is provided by refrigeration unit 18 and coil 19, shown attached to the inside of the top of housing 20. Housing 20 is preferably of stainless steel and filled with an insulating material, such as polyurethane foam, not shown. Door 21, of material and construction similar to that of housing 20, contains windows 22; 22a to provide access for viewing, recording or analyzing, as herein described, and 22b and 22c to permit lighting of the specimen such as by movie lights, not shown. The inside surfaces of housing 20 are preferably coated with a dark, light-absorbing material, such as black paint, in order to enhance the appearance of the specimen as much as possible. The windows are preferably of a material and construction to provide adequate thermal insulation. Windows constructed of two sheets of optically clear glass seperated by an evacuated space are particularly suited to such an application. Door 21 is preferably attached to housing 20 by means which permit opening of the door without the necessity of moving the camera or other recording means. Sliding brackets 23 and knurled knobs 24 in FIG. 1 are but one of many means for achieving this result, as will be appreciated by those skilled in the art.

The camera or other recording or analyzing means is supported by sliding camera support base 25, which rides on precision guides 26a and 26b via ball bushings 27a and 27b. The ends of guides 26 are supported by bar 28, feet 29a and 29b, and by support 10 inside the housing 20. Gaskets 30a and 30b maintain a seal between the indide and outside of housing 20. While the distance between the camera or other instrument and the specimen may be adjusted approximately by moving sliding base 25, (and secured, for example, by sleeves and set screws, not shown), accurate adjustment is provided by three-axis micropositioner 31. The camera is attached to positioner 31 by means of right angle bracket 32.

Tray 33 collects the cut sections via opening 34 which extends through base 10 and housing 20.

Referring now to FIG. 2, there is shown a rear perspective view of a portion of the preferred embodiment of FIG. 1, partially cut away. Variable speed motor 35 drives spindel 14 via pulleys 36 and 37, belt 38, shaft 39 and coupling 40. While a wide range of speeds of spindel 14 rotation would in general be desireable, variation within the range of one-half to 20 revolutions per second will usually be adequate for purposes of the invention. Variable speed motors controllable within this range are of several types, generally known and commercially available. Timer 41 provides synchronization between the spindel rotation and the camera or other recording or analyzing instrument via lead 42, so that, for example, the camera or other instrument may be activated after each new surface of the specimen is exposed by sectioning. In a preferred embodiment, a motion picture camera is activated to expose from one to ten frames per knife revolution. Conventional timers of any of several types, either electronic or mechanical or a combination of these are suitable for the practice of the invention, and thus are not a necessary part of this description.

Advance of the specimen into the periphery of the circle of rotation of the knife blades may be achieved by any of several means, such as the rachet and pawl advancing mechanism illustrated in FIG. 2. In the Figure, rotating drive wheel 43 supplies reciprocating motion to slotted lever 44, which is moveably mounted on drive wheel 43 by bolt 45 and at 44a. Click pawl 47, moveably mounted on lever 44 and secured by stop 47a imparts rotary movement to rachet wheel 48 by engaging the teeth thereof. Wheel 48 with spline (not shown) is keyed to lead screw 46, which extends through threaded block 49 to specimen support base 12. Block 49 is secured with a springloaded nut, not shown, to insure against backlash in the mechanism. Pawl 50 further insures against backlash by preventing backward motion of wheel 48.

It will in general be suitable for purposes of the invention to advance the specimen into the rotating knife in increments of from 1 to 200 microns. By way of example only, one micron increments may be achieved in the arrangement of FIG. 2 utilizing a 640 pitch lead screw and a 4 inch diameter rachet wheel having 250 teeth. The increment may be conveniently increased by replacing the ratchet wheel with one having less teeth or by adjusting the travel of lever 44, so as to increase the distance over which pawl 47 traverses, as is known. It is stressed that the rachet and pawl mechanism of FIG. 2 is but one of many precision advancing means which would be suitable for use in the invention. Another advancing arrangement is shown schematically in FIG. 3 in which lead screw 46 is advanced through screw block 49 by a second motor 51 via pulleys 52 and 63 and belt 53. Electronic timer 54 controls the motor in order to impart sufficient drive to screw 46 in order to achieve the desired forward motion of specimen support 12, not shown. With such an arrangement, continuous advancement of the specimen into the knife, as well as incremental advancement, may be achieved. Continuous advancement may be preferred, for example, in cases in which very rapid sectioning rates are desired.

It is of course unnecessary to the achievement of sectioning that the specimen advance into the rotating knife. The rotating knife may alternatively advance into the specimen. FIG. 4 illustrates such an arrangement schematically. Rotary motion to the spindel (not shown) is imparted via motor 35, as in FIG. 2. However, motor 35 is moveably mounted on lead screw 55, advance of which is achieved via timer 56, motor 57 pulleys 58a and 58b and belt 58c, in an arrangement similar to that shown in FIG. 3. Fork 59 secured by guide members 59a and hub 59b then transmits the advancing motion to shaft 39. Lead screw 55 is supported by bracket 62 and screw block 49.

It may be desired to adjust the position of the specimen after it has been attached to its support. FIG. 5 shows one means of accomplishing this by providing a concace socket in support 12 to receive ball 60 attached to mounting plate 61. Advancement of set screw 62 against ball 60 secures the finally adjusted position of the mounting plate 61 and specimen.

The invention has been described in terms of a limited number of embodiments. Other embodiments will become apparent to those skilled in the art in view of the above description, and accordingly such embodiments form a part of this invention.

We claim:

1. An apparatus for producing a motion picture of serial sections of a frozen organic specimen which when exhibited gives the impression that an observer is moving through the specimen, thus permitting the tracing of selected elements or features through the specimen comprising:
   a rotating knife,
   means for achieving relative motion of the knife and the specimen along an axis approximately parallel to the axis of rotation of the knife and within the periphery of the circle of rotation of the knife, so that said relative motion results in the cutting of serial sections from the specimen by the knife,
   a thermally insulated housing enclosing the knife and the specimen, the housing containing at least one thermally insulated window to enable examination of the specimen's cut surfaces,
   refrigeration means for maintaining the interior of the housing within the temperature range of −30°C. to +30°C.,
   motion picture recording means, for serially recording the appearance of the surfaces of the specimen exposed by sectioning,
   means to support the recording means outside the enclosure adjacent the window,
   means for adjusting the position of the support means relative to the specimen, and
   timer means for synchronizing the recording means with the rotating knife, so that the recording means is activated at least once after each new surface of the specimen is exposed by sectioning.

2. The apparatus of claim 1 in which the adjusting means comprises at least one precision guide slidably mounted in the enclosure to slide along an axis approximately parallel to the axis of rotation of the knife, and a micropositioner mounted on the guide for micropositioning the recording means relative to the specimen.

3. The apparatus of claim 1 which includes:
   a base support,
   a spindle, rotatably mounted on the base support, the knife mounted on the spindle normal to the axis of rotation of the spindle,
   means for rotating the spindle and knife,
   means for supporting the specimen, said means moveably mounted on the base support, and
   means for achieving relative motion of the knife and specimen comprising means for moving the specimen support means along an axis approximately parallel to the axis of rotation of the spindle.

4. The apparatus of claim 3 in which means are provided for varying the speed of rotation of the spindel.

5. The apparatus of claim 4 in which said means varies the speed of rotation of the spindel within the range of one-half to 20 revolutions per second.

6. The apparatus of claim 3 in which the means for moving the specimen support means provides for incremental movement.

7. The apparatus of claim 6 in which the means for moving the specimen support means provides for varying the amount of the increment.

8. The apparatus of claim 7 in which the means for moving the specimen support means provides for incremental movements of from one to 200 microns.

9. The apparatus of claim 3 in which means are provided to adjust the position of the specimen support means relative to the base support.

\* \* \* \* \*